2,867,509

DIRECT COLOR TEST EMPLOYING DIISONITROSOACETONE

Valentine J. Fischer, Newark, N. J., and Jacob I. Miller, Baltimore, Samuel Sass, Edgewood, and Benjamin Witten, Baltimore, Md., assignors to the United States of America as represented by the Secretary of the Army No Drawing. Application November 8, 1956
Serial No. 621,184

1 Claim. (Cl. 23—230)

(Granted under Title 35, U. S. Code (1952), sec. 266)

The invention described herein may be manufactured and used by or for the Government of the United States of America for governmental purposes without the payment to us of any royalty thereon.

This invention relates to a new method and composition for the detection of the highly toxic phosphorus contataining Chemical Warfare agents such as isopropyl methylphosphonofluoridate (GB),

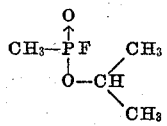

ethyl dimethylphosphoramidocyanidate (GA),

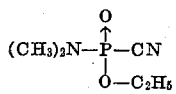

pinacolyl methylphosphonofluoridate (GD),

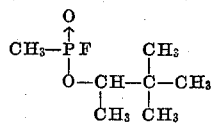

and cyclohexyl methylphosphonofluoridate (GF)

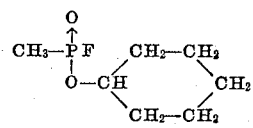

collectively known as the "G-Agents." We are able to detect extremely minute quantities of these agents in the form of vapors or droplets or in solution.

Our invention is also applicable to the detection of other phosphorus compounds, including a number of commercial insecticides, and to acid halides. In general, we find that compounds which give the Schoenemann reaction (see abstracts of the Pittsburgh Conference on Analytical Chemistry and Applied Spectroscopy, February 27–March 2, 1956, Analytical Chemistry Group, Pittsburgh Section, American Chemical Society), also respond to our test.

A particular advantage of our reaction resides in the fact that it is especially sensitive to the most toxic compounds, i. e., the G-Agents.

Our invention is based on the reaction, under alkaline conditions, of compounds of the above group with diisonitroso acetone (acetone dioxime)

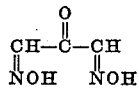

with the production of a colored compound.

The pH is important. It should lie in the range 8.3 to 8.5 and should preferably be 8.4. At lower pH values, e. g. 7 to 8, the color develops much more slowly and never reaches the intensity of the attained at the preferred values. At higher pH, it develops rapidly and then rapidly fades.

Either the oxime or its salts of the alkali metals or amines may be employed. The monosodium salt is particularly desirable, since it is self-buffering at the preferred pH 8.4. The same is true of the monodibutyl- amine salt. When the oxime itself, or other salts, are employed, a buffer, e. g. sodium bicarbonate or sodium borate, should be added.

The reagents may be used in aqueous solution, incorporated in a crayon, or impregnated on a porous surface, e. g. paper or silica gel.

The following examples illustrate various phases of our invention.

EXAMPLE 1

Preparation of reagents

Diisonitrosoacetone (DIA) was prepared by the method of Pechmann and Wehsarg, Berichte, 19, 2465 (1886). It was purified by (1) dissolving in hot ether or (2) recrystallizing three times from water heated to 60–70° C. The water should not be heated above 70° C. as DIA in water decomposes rapidly above that temperature. The compound should melt with decomposition at 141–143° C. when the material in a capillary tube is placed in a bath preheated to approximately 135° C. A 0.40° solution in water is used as the reagent.

A buffering solution (pH 8.4) was prepared by adding approximately 17 ml. of 0.5 N aqueous sodium hydroxide to 500 ml. of 0.1 M boric acid. The addition of sodium hydroxide was controlled by the use of a pH meter to give the exact pH desired.

The monosodium salt of diisonitrosoacetone was employed as a 0.40% solution in water which should be prepared daily. This reagent was prepared by placing 18 g. of diisonitrosoacetone and 200 ml. of absolute ethanol in a 500 ml. three-neck round bottom flask which was equipped with a mercury-sealed stirrer, a condenser, and a dropping funnel. All openings were protected from atmospheric moisture by calcium chloride tubes. A sodium ethylate solution was prepared by the addition of 3.6 g. of metallic sodium to 100 ml. of absolute alcohol. This was added dropwise to the stirred reaction mixture of diisonitrosoacetone solution from the dropping funnel. After addition of the sodium ethylate solution, the mixture was stirred for 15 min., filtered and washed once with approximately 25 ml. of absolute ethanol. The sodium salt was dried in a vacuum desiccator over phosphorus pentoxide. A theoretical yield of a light yellow product was obtained. The sodium salt darkens considerably at 110–115° C., and decomposes violently at 120–121° C.

The di- and "trisodium" salts were prepared by adding the appropriate theoretical quantities of sodium ethylate to give these salts. The treatment was similar to that of the monosodium salt. When a capillary tube containing the disodium salt was placed in a bath at 160° C. no violent decomposition was observed. However, when inserted in a bath at 170° C. the compound decomposed violently. The "trisodium" salt when placed in a capillary showed no violent decomposition in a bath at 133° C. At 139° C. the compound decomposed violently.

EXAMPLE 2

Procedure (a) *Calibration curve.*—Prepare solutions of GB, or other compounds which give the "Schoenemann" reaction, in 2-propanol. The dilutions are so selected that convenient concentrations in the range of 5 to 60 micrograms per ml. can be aliquoted. Pipette 1 ml. of each agent concentration into Klett tubes or similar optical tubes and add 1 ml. of diisonitrosoacetone (or the di- or trisodium diisonitrosoacetone salt) reagent (0.40% solution). Mix and add 3 ml. of buffer solution (the sodium borate solution described above or 2% aqueous sodium bicarbonate), stir, allow to stand, measure on a Klett-Summerson photoelectric colorimeter using filter No. 50 (470–530 m$\mu$), or on a similar instrument. The color remains stable for 10 minutes. Prepare a calibration curve by plotting agent concentration against Klett units (or the readings of the particular colorimeter employed).

When the monosodium or monodibutyl amine salt of diisonitrosoacetone is used as the reagent, it is unnecessary to employ the buffer solution. Add 1 ml. of the 2-propanol solution, 3 ml. of distilled water and 1 ml. of the reagent.

When the GB (or other compound) is to be determined in aqueous solution, it is possible to increase the sensitivity of the system by the following procedure. Make up known dilutions of the compound in water rather than in 2-propanol. Add 4 ml. of the agent solution and 1 ml. of the monosodium diisonitrosoacetone reagent. Prepare the calibration curve as before.

(b) *Sample determination.*—Pipette samples of GB or other compounds in solution into the Klett tubes and treat as described in the procedure for the calibration curve. Apply the reading to the previously prepared calibration curve to obtain the concentration of agent in the unknown solution.

The sensitivities, i. e. the minimum detectable quantities of some of the agents in solution using the procedure given above, are shown in Table 1.

| Compound | Sensitivity, Micrograms per milliliter of solution |
| --- | --- |
| GA | 1 |
| GD | 1 |
| GF | 1 |
| GB | 1 |
| Diisopropylphosphofluoridate | 1 |
| Tetraethylpyrophosphate | 2 |
| Para-oxon | 5 |
| Parathion | 10 |
| Benzenesulfonyl chloride | 8 |
| Benzoyl chloride | 8 |
| Bromine | 2 |
| N-Bromosuccinamide | 3 |

Still higher sensitivities are obtained when color is developed in a narrow silica gel tube, as a spot on impregnated paper or on a diisonitrosoacetone crayon work rather than a diluted solution.

The following examples show various detection procedures.

EXAMPLE 3

Crayon

A salt mixture, which was prepared by the reaction of 5 equivalents of sodium ethylate with 1 mole of DIA in ethanol was pressed in a mold at 1000 lb./sq. in. to form a crayon. On subjecting the crayon mark to GB vapor or droplets, a magenta color is formed.

EXAMPLE 4

Impregnated silica gel

A salt mixture, which was prepared by the reaction of 3 equivalents of sodium methoxide with one mole of DIA, was dissolved in methanol and the mixture was converted to a slurry by the addition of activated silica gel. The methanol was spontaneously evaporated and the impregnated gel was placed in detector tubes. On absorbing the vapor of GB or other substances of the class specified above, a magenta color developed within 30 to 60 seconds. The color persisted for approximately 24 hours.

EXAMPLE 5

Impregnated paper

The impregnated paper was prepared by dipping filter paper into a strong solution of the "trisodium" salt of DIA in methanol and allowing the methanol to evaporate. It was found that a color test could be obtained on this paper when moisture with water before or after contacting the paper with GB or the other compounds of the group.

EXAMPLE 6

Capsule

Gelatine capsules are prepared containing 40 mg. each of the disodium salt of diisonitrosoacetone. A capsule is dropped into 50 ml. of an aqueous solution. Development of a magenta color indicates the presence of one of the compounds of the group identified above.

We claim:

A method for the detection of a substance selected from the group consisting of isopropyl methylphosphonofluoridate, ethyl dimethylphosphoroamidocyanidate, pinacolyl methylphosphonofluoridate, cyclohexyl methylphosphonofluoridate, diisopropylphosphofluoridate, tetraethyl pyrophosphate, para-oxon, and parathion, which comprises reacting said compound under alkaline conditions with a compound selected from the group consisting of diisonitrosoacetone and the amine and alkali metal salts thereof.

References Cited in the file of this patent

UNITED STATES PATENTS

| | | |
| --- | --- | --- |
| 458,244 | Tyree | Aug. 25, 1891 |
| 691,249 | Dieterich | Jan. 14, 1902 |
| 2,054,885 | Shroter | Sept. 22, 1936 |

OTHER REFERENCES

Welcher "Organic Anal. Reagents" Vol. III 1947, p. 277

UNITED STATES PATENT OFFICE
CERTIFICATE OF CORRECTION

Patent No. 2,867,509                                January 6, 1959

Valentine J. Fischer et al.

It is hereby certified that error appears in the printed specification of the above numbered patent requiring correction and that the said Letters Patent should read as corrected below.

Column 3, Table 1, first column thereof, line 5, for "Diisopropylphosphofluoridate" read -- Diisopropylphosphorofluoridate --; same table, first column thereof, last line, for "N-Bromosuccinamide" read -- N-Bromosuccinimide --; column 4, line 41, for "diisopropylphosphofluoridate" read -- diisopropylphosphorofluoridate --.

Signed and sealed this 28th day of July 1959.

(SEAL)
Attest:

KARL H. AXLINE                                            ROBERT C. WATSON

Attesting Officer                                         Commissioner of Patents